United States Patent
Hedberg et al.

(10) Patent No.: US 9,357,400 B2
(45) Date of Patent: May 31, 2016

(54) METHODS AND APPARATUSES FOR SHARING A RADIO NODE

(75) Inventors: Tomas Hedberg, Stockholm (SE); Tomas Nylander, Värmdö (SE); Jari Vikberg, Järna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/113,029

(22) PCT Filed: Apr. 27, 2011

(86) PCT No.: PCT/SE2011/050515
§ 371 (c)(1),
(2), (4) Date: Oct. 21, 2013

(87) PCT Pub. No.: WO2012/148329
PCT Pub. Date: Nov. 1, 2012

(65) Prior Publication Data
US 2014/0038620 A1   Feb. 6, 2014

(51) Int. Cl.
*H04W 16/14*   (2009.01)
*H04W 48/10*   (2009.01)

(52) U.S. Cl.
CPC .............. *H04W 16/14* (2013.01); *H04W 48/10* (2013.01)

(58) Field of Classification Search
CPC ..... H04W 16/14; H04W 48/10; H04W 24/04; H04W 36/18; H04W 88/06; H04W 64/003
USPC ................ 455/448, 411, 422.1; 370/329, 254
See application file for complete search history.

(56) References Cited

U.S. PATENT DOCUMENTS

2011/0030035 A1*  2/2011  Wu .................................... 726/4
2011/0075621 A1*  3/2011  Sung et al. .................... 370/329

FOREIGN PATENT DOCUMENTS

WO   2008054668 A2   5/2008

OTHER PUBLICATIONS

3rd Generation Partnership Project. "3GPP TS 36.300 V10.3.0 (Mar. 2011)," 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10). Mar. 2011. pp. 1-2.

(Continued)

*Primary Examiner* — Phuoc H Doan
(74) *Attorney, Agent, or Firm* — Murphy, Bilak & Homiller, PLLC

(57) ABSTRACT

A method and a radio node (RN) shared by operators of separate cellular networks having operator specific tracking area plans. The radio node (RN) broadcasts (1:1) system information with network identities of the cellular networks (PLMN IDs) and multiple operator specific tracking area codes (TACs) valid in respective tracking area plans of the cellular networks, each tracking area code being associated with a corresponding network identity in the system information. Thereby, the operators are enabled to use their own operator specific tracking area codes for their respective operator specific tracking areas that include a cell (100) covered by the radio node.

15 Claims, 5 Drawing Sheets

(56) References Cited

OTHER PUBLICATIONS

3rd Generation Partnership Project, "3GPP TS 36.331 V10.1.0 (Mar. 2011)," 3rd Generation Partnership Project Technical Specification Group Radio Access Network Evolved Universal Terrestrial Radio Access (E-UTRA); Radio Resource Control (RRC) Protocol specification (Release 10). Mar. 2011. pp. 1-3.

Unknown, Author, "Reply LS on Area and Access Restrictions", 3GPP TSG RAN WG2 Meeting #61, R2-081196, CT1, Sorrento, Italy, Feb. 11-15, 2008, 1-2.

Unknown, Author, "Tracking Areas in eNB", 3GPP TSG RAN WG3 #56, R3-071030, Vodafone Group, NTT DoCoMo, Orange, Telecom Italia, Kobe, Japan, May 2, 2007, 1-2.

* cited by examiner

METHODS AND APPARATUSES FOR SHARING A RADIO NODE

TECHNICAL FIELD

The invention relates generally to a methods and apparatuses for facilitating employment of a radio node shared by multiple cellular network operators.

BACKGROUND

It is quite common that multiple operators of cellular networks, often referred to as Public Land Mobile Networks (PLMNs), provide wireless communication services in the same geographical region by running their own networks "in parallel" using their own proprietary equipment, including base stations covering corresponding cells. In this way, each operator has full control of its services and resources when providing such services to their respective subscribers, while their coverage areas are at least partly overlapping.

In such a scenario, it is common that the operators' coverage areas include so-called "hot-spots", which are usually limited areas with a high concentration of terminal users generating dense traffic which often results in congestion in a cell such that no further sessions can be admitted in the cell. This can be solved by adding a base station with relatively low output power to the existing network to provide an extra cell of small size and with additional capacity for radio communication. On the other hand, there may also be areas with deficient radio coverage where there is a need for coverage extension to avoid loss of radio contact with mobile terminals in those areas due to poor radio reception, which again can be solved by adding an extra base station to compensate for missing coverage in such an area.

When multiple network operators need to add an extra base station to provide additional coverage in basically the same area, for whatever reason, considerable costs and efforts can be saved by sharing the same base station instead of setting up one base station per operator to provide basically the same coverage. In this way, a plurality of such shared base stations may be employed by multiple operators to supplement their cellular networks wherever needed.

In the following, the term "radio node" will be used to generally represent a node providing radio coverage in one or more cells, which could be e.g. a base station, a Radio Network Controller (RNC) or an e-Node B, depending on the technology and terminology used. It should be noted that this description pertains to any technologies and communication standards where shared radio nodes can be employed, such as GSM, UMTS, LTE, etc. In some implementations, a shared radio node is connected to multiple core networks belonging to the respective operators, typically using an Iu interface connection to a Serving GPRS Support Node (SGSN) or Mobile Switching Centre (MSC), or an S1 interface/connection to a Mobility Management Entity (MME) in respective core networks. The above arrangement of employing a shared radio node by multiple operators and core networks is often referred to as "Multi-Operator Core Network" (MOCN). The shared radio node is also connected to the existing individual radio networks, e.g. using X2 connections such as in the case of E-UTRAN, in order to properly interact with each operator specific radio network, e.g. for handover signalling. Accordingly, the shared radio node must thus be configured to interact with all operator specific networks, i.e. both core and radio networks, in line with their specific requirements and used schemes.

However, it may be difficult for the individual operators to incorporate the shared radio node and its coverage in their existing cell structures and procedures which are typically configured by means of careful cell planning, among other things. Moreover, a cellular radio network is typically divided into so-called "tracking areas", sometimes also termed "registration areas", "location areas" or "paging areas". In the following, the term "tracking area" will be used to represent any of the above expressions without limitation to any particular used technology. A tracking area typically includes a group of adjacent cells and can be of any suitable size, as determined by the operator to fit into an overall cell plan.

Such tracking areas are used to enable paging of mobile terminals based on e.g. tracking area update messages transmitted regularly from the terminals to the core network as they move from one tracking area to another in idle state. This type of message is often referred to as "Tracking Area Update Request" or TAU in LTE, or "Location Update" and "Routing Area Update" in GSM and in UMTS.

In this way, the core network can page a terminal for an incoming call by transmitting a paging message only in the cells of the terminal's latest reported tracking area. When entering a cell in idle state, the terminal can in turn determine whether it is necessary to update its tracking area to the core network by reading a Tracking Area Code, typically denoted TAC, being typically a numeric value which is regularly broadcasted along with other system information in each cell. That is, the terminal sends a new message for updating tracking area towards the core network when the terminal reads a TAC that is different since its previous transmitted tracking area update(s). In some implementations, the terminal maintains a so-called "Tracking Area (TA) list" with multiple TACs as provided from the core network, and when reading a broadcasted TAC not included in the TA list, the terminal initiates a tracking area update such that the serving radio node reports that TAC to the core network. Thereby, the core network knows the location of each terminal on a tracking area level, i.e. the core network knows that the terminal is likely located within one or a few known tracking areas.

As indicated above, when shared radio nodes are employed by multiple operators, their respective radio networks comprise a mix of dedicated and shared radio nodes which may be difficult to coordinate in a common radio network structure. The above TAC parameter is typically assigned to cells according to an operator specific scheme, in order to support an effective and logic paging procedure which is adapted to fit the tracking area plan of the operator's radio network.

In short, each operator has its own division of cells into tracking areas and the tracking area plan of one radio network differs from that of another radio network. Therefore, it is a problem that the TAC broadcasted by a shared radio node may not be very useful or fitting in the cell plan or tracking area plan of a particular operator specific radio network, and the operators must find solutions to bring about a compromise or conversion between a "shared" TAC and their operator specific tracking area plans. For example, a particular cell of a shared radio node may be comprised in a certain tracking area of one operator while the same cell may be comprised in an altogether different tracking area of another operator. If a cellular network includes multiple shared radio nodes in the range of, say, 50-100 it is a difficult and demanding task to plan tracking areas which must be coordinated with the other operators' networks.

SUMMARY

It is an object of the invention to address at least some of the problems and shortcomings outlined above. It is possible to achieve these objects and others by using methods and apparatuses as defined in the attached independent claims.

According to one aspect, a method is provided in a radio node shared by operators of separate cellular networks having operator specific tracking area plans. In this method, the shared radio node broadcasts system information that comprises network identities of the cellular networks and multiple operator specific tracking area codes which are valid in respective tracking area plans in the cellular networks. Each tracking area code is associated with a corresponding network identity in the system information. Thereby, the operators are enabled to use operator specific tracking area codes for operator specific tracking areas that include a cell covered by the shared radio node.

According to another aspect, a radio node is provided that is shared by operators of separate cellular networks. The radio node comprises a broadcasting module adapted to broadcast system information that includes network identities of the cellular networks and multiple operator specific tracking area codes valid in respective tracking area plans of the operators. Each tracking area code is associated with a corresponding network identity in the system information. Thereby, the operators are enabled to use operator specific tracking area codes for operator specific tracking areas that include a cell covered by the shared radio node.

The above method and radio node may be configured and implemented according to different optional embodiments. In one possible embodiment, the broadcasted tracking area codes are associated with the broadcasted network identities according to a predefined mapping scheme. The predefined mapping scheme may map positions in a separately broadcasted record of tracking area codes to positions in a separately broadcasted record of network identities. In that case, the record of tracking area codes and the record of network identities may be broadcasted in one system information block, or the record of network identities may be broadcasted in one system information block while the record of tracking area codes may be broadcasted in another system information block. Alternatively, the network identities and the corresponding tracking area codes may be broadcasted jointly in a common record.

In further possible embodiments, the shared radio node may receive a message from a mobile terminal, read a network identity of a preferred cellular network in the received message, and determine an operator specific tracking area code associated with the read network identity. The shared radio node may further establish a session for the terminal with a core network of the read network identity and send the operator specific tracking area code to the core network. The shared radio node may receive the message from the terminal in connection with any of: a tracking area update, a service request and a paging response, and the received message may be an RRC Connection Setup Complete message. The tracking area code may further be sent together with the network identity in a Tracking Area Identity to the core network.

According to another aspect, a method is provided in a mobile terminal for using a radio node shared by operators of separate cellular networks having operator specific tracking area plans. In this method, the mobile terminal receives from the shared radio node broadcasted system information that comprises network identities of the cellular networks and multiple operator specific tracking area codes valid in respective tracking area plans of the operators. Each tracking area code is associated with a corresponding network identity in the system information. The mobile terminal also identifies, among the broadcasted network identities, a network identity of a preferred cellular network, and determines a tracking area code associated with the identified network identity. The mobile terminal then determines whether it is necessary to update a tracking area based on the determined tracking area code, and in that case sends a tracking area update to the radio node directed to a core network of the identified network identity.

According to another aspect, a mobile terminal is provided for using a radio node shared by operators of separate cellular networks having operator specific tracking area plans. The mobile terminal comprises a receiving module adapted to receive broadcasted system information that comprises network identities of the cellular networks and multiple operator specific tracking area codes valid in respective tracking area plans of the operators, each tracking area code being associated with a corresponding network identity in the system information. The mobile terminal further comprises a logic module adapted to identify, among the broadcasted network identities, a network identity of a preferred cellular network, determine a tracking area code associated with the identified network identity, and determine whether it is necessary to update a tracking area based on the determined tracking area code. The mobile terminal also comprises a sending module adapted to send a tracking area update to the radio node directed to a core network of the identified network identity, if a tracking area update was determined to be necessary.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
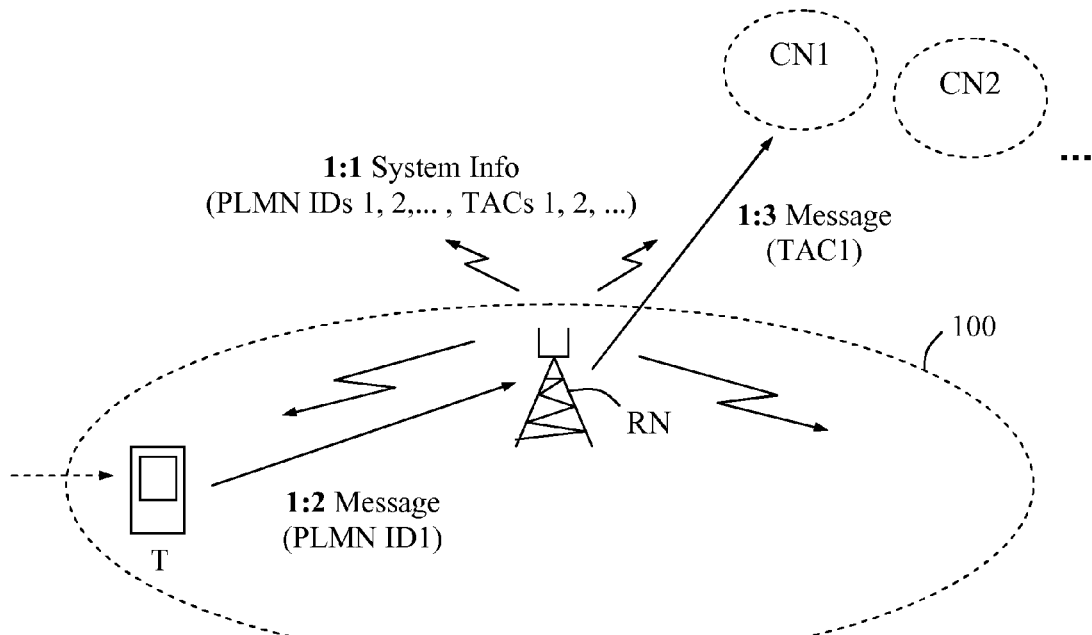
FIG. 1 is a communication scenario illustrating how broadcasted system information can be used, according to a possible embodiment.

Briefly described, a solution is provided to enable multiple cellular network operators to use their own tracking area plans when employing a shared radio node. This is made possible by broadcasting system information from the shared radio node that includes network identities (IDs) of the cellular networks, referred to as PLMN IDs in this description, and multiple Tracking Area Codes, TACs, each TAC being associated with a corresponding network identity. The individual TACs are thus valid for the respective operators that employ the shared radio node within their individual operator specific tracking area plans. In this way, each operator can freely arrange the shared radio node in a tracking area of its own operator specific tracking area plan and use any suitable TAC for that tracking area, without having to coordinate and share the TAC with any other operator.

When receiving such broadcasted information from a shared radio node, a mobile terminal and the radio node can use this information in different scenarios as follows. When present in the cell of the shared radio node, the terminal can identify a network identity of a preferred cellular network, such as a home network or the equivalent, among the broadcasted network identities. In this context, the term "preferred" implies that the terminal is configured to primarily interact with its preferred cellular network but not necessarily with other non-preferred networks. The terminal can then send a message to the radio node referring to the identified network identity, which message may be sent in connection with, e.g. a tracking area update, a service request or a paging response, depending on the situation.

In one example, the terminal determines a tracking area code, among the broadcasted tracking area codes, that is associated with the identified network identity, and decides whether a tracking area update to the terminal's core network is needed when the terminal is in idle mode, based on the determined tracking area code. If so, the terminal sends a tracking area update message with the identified network identity to the radio node which is able to determine which tracking area code is associated with the received network identity. The radio node then sends that tracking area code to the core network, thereby reporting the whereabouts of the terminal.

In other examples, the terminal can provide the identified network identity to the radio node in connection with making a service request to initiate a communication session over the radio node, or a paging response after receiving a paging message issued from the core network of the cellular network to which the terminal is current registered. In either case, the radio node can read the network identity in the received message and determine an operator specific tracking area code associated with the read network identity. The radio node also establishes a session for the terminal with a core network of the read network identity and sends the operator specific tracking area code to the core network, thus reporting the whereabouts of the terminal to the core network. It is a common practice in cellular networks that a serving radio node indicates to the core network the tracking area from which a terminal has sent a service request or a paging response, e.g. in the form of so-called S1 Application Protocol (S1AP) messages in the case of LTE, as the terminal changes from idle to active state.

In the following examples, a network identity will be referred to as PLMN ID, although other similar terms and expressions could also be used depending on the type of network and terminology used therein. A possible communication scenario is illustrated in FIG. 1 where the solution is used as follows. In this scenario, a radio node RN providing radio coverage in a cell 100, is shared by multiple operators of separate cellular networks, not shown. The operators also have their own corresponding core networks CN1, CN2, . . . to which the radio node RN is connected, e.g. by an Iu interface to an SGSN or MSC, or an S1 interface/connection to an MME, as described above. The radio node RN may also be connected to various other radio nodes in the respective cellular networks, although not shown in this simplified example.

According to this solution, the radio node RN continuously broadcasts system information in the cell, as illustrated by an action 1:1, comprising PLMN IDs of the cellular networks of CN1, CN2 . . . and multiple operator specific tracking area codes TAC1, TAC2 . . . valid in respective tracking area plans in those cellular networks. In the broadcasted system information, each TAC is associated with a corresponding PLMN ID, which will be exemplified later below with reference to FIGS. 2-4.

A mobile terminal T now enters the cell 100, as indicated by a dashed arrow, and receives the broadcasted system information including the PLMN IDs and associated TACs. After identifying, among the broadcasted PLMN IDs, the PLMN ID of the terminal's preferred cellular network, in this case PLMN ID1, it is able to also determine the TAC, among the broadcasted TACs, that is associated with the identified network identity, in this case TAC1. For example, the terminal T may be adapted to interact with RN only if it can read, from the broadcasted system information, a known PLMN ID that has been pre-configured in the terminal.

The terminal then sends a message to the radio node RN directed to a core network of the identified network identity PLMN ID1, in this case CN1, in another action 1:2. For example, this message may be sent in connection with the above-mentioned Tracking Area Update Request or TAU which the terminal is configured to make after determining that it is necessary to update its tracking area based on the determined TAC1. Otherwise, the message of action 1:2 could be sent in connection with a service request or a paging response, as exemplified above. The radio node RN is then able to read the PLMN ID1 in the received message and determine the operator specific tracking area code TAC1 that is associated with PLMN ID1. The radio node RN then establishes a session for the terminal with CN1 of the read network identity PLMN ID1, and sends TAC1 to CN1 in another message, as shown in a final action 1:3.

Figure 2:
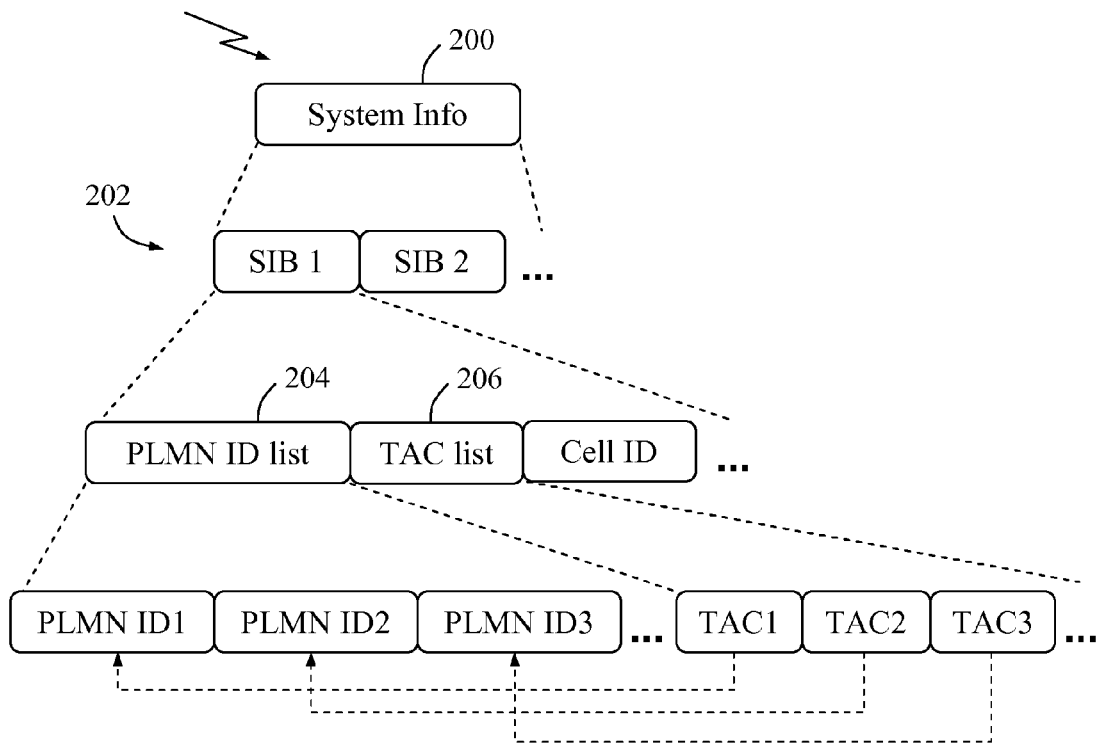
FIGS. 2-4 are schematic diagrams illustrating some optional schemes for broadcasting system information, according to some possible embodiments.
Figure 3:
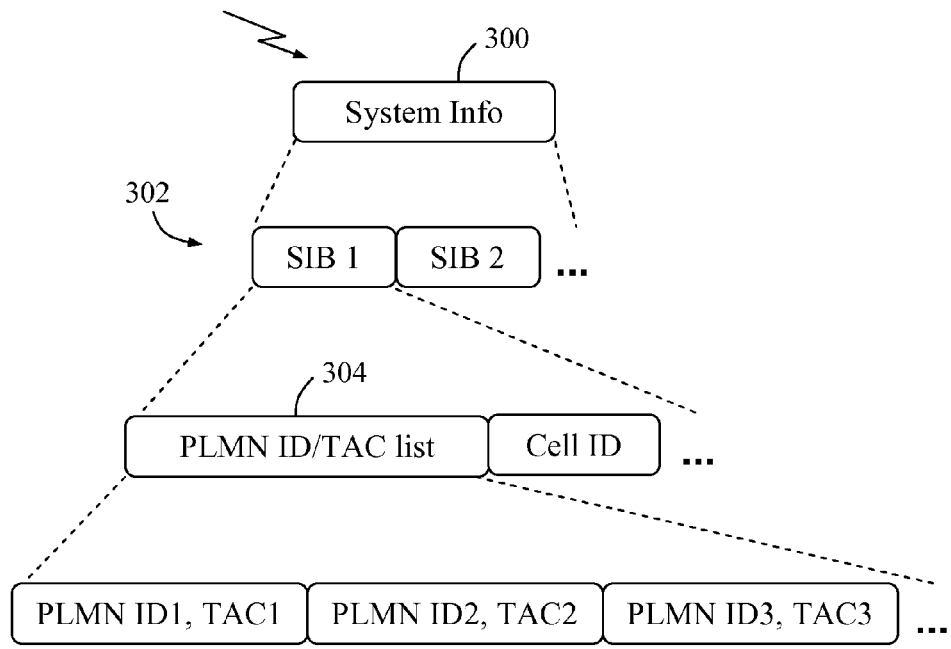
Figure 4:
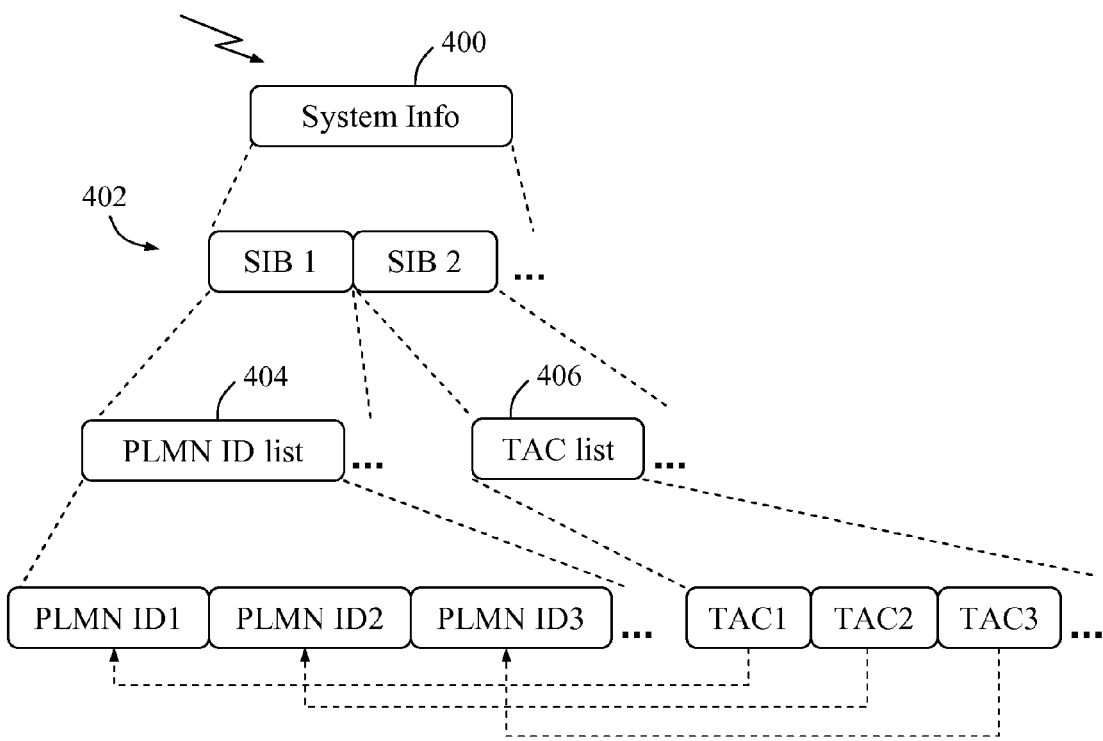

Some examples of how a shared radio node, such as RN in FIG. 1, can broadcast system information according to this solution, including PLMN IDs and associated TACs, will now be described with reference to the schematic diagrams in FIGS. 2-4. As indicated above, a radio node normally broadcasts various system information according to a predefined scheme which is repeated at regular intervals, such that whenever a terminal enters the cell it will be able to read all this information in due time as soon a complete cycle of information has been broadcasted. FIGS. 2-4 illustrate some parts of this broadcast information that are noteworthy for this solution, while other non-significant parts have been omitted for simplicity. In particular, these figures illustrate how the PLMN IDs and TACs can be arranged within the broadcasted system information according to some possible implementations.

In the example of FIG. 2, the shared radio node broadcasts system information 200 which is divided into different successive System Information Blocks (SIBs) 202 denoted SIB1, SIB2, and so forth, which is a customary procedure in some telecommunication standards such as LTE. In one of the system information blocks denoted SIB1, a record or list 204 of PLMN IDs are broadcasted, i.e. the record 204 contains network identities PLMN ID1, PLMN ID2, PLMN ID3 . . . which identify the individual operators and their cellular networks which share the radio node in question. Further, a record or list 206 of TACs associated to the PLMN IDs in record 204 are also broadcasted in the system information block SIB1, i.e. the record 206 contains tracking area codes TAC1, TAC2, TAC3 . . . which are associated with PLMN ID1, PLMN ID2, PLMN ID3 . . . , respectively, as indicated by dashed arrows in the figure.

In this context, the broadcasted TACs in record 206 may be associated with the broadcasted PLMN IDs in record 204 according to a predefined mapping scheme known by the terminal. For example, the predefined mapping scheme may be configured to map positions in the separately broadcasted TAC record 206 to positions in the separately broadcasted PLMN ID record 204, as in the scheme of FIG. 2. In this example, the first, second and third positions in record 206 are mapped to the first, second and third positions in record 204, respectively. However, it is possible to map any position in record 206 to any position in record 206, as dictated by the mapping scheme, and the invention is not limited to any particular mapping scheme. The first position in record 204 may e.g. be mapped to the last position in record 206 instead, and so forth.

FIG. 3 illustrates another example of arranging PLMN IDs and TACs within system information 300 broadcasted from a shared radio node. In a system information block SIB1 among broadcasted system information blocks 302, the radio node broadcasts the PLMN IDs and the corresponding TACs jointly in a common record 304 which thus includes successive pairs of PLMN IDs and associated TACs as shown in the figure. For example, if the current 3GPP standard 36.331 is used, the TAC information can be added to an existing element/parameter of PLMN information to form the common record 304, as follows:

```
PLMN-IdentityList ::=         SEQUENCE (SIZE (1..6)) OF
                              PLMN-IdentityInfo
PLMN-IdentityInfo ::=         SEQUENCE {
    plmn-Identity                PLMN-Identity,
    cellReservedForOperatorUse   ENUMERATED {reserved,
                                              notReversed}
    trackingAreaCode
}
```

Yet another possible example is illustrated in FIG. 4 where broadcasted system information 400 comprises two separate system information blocks 402 where one block SIB1 contains a separately broadcasted PLMN ID record 404 and another block, in this example the next block SIB2, contains a separately broadcasted TAC record 406. As in the example in FIG. 2, the tracking area codes TAC1, TAC2, TAC3 . . . in record 406 are associated with the network identities PLMN ID1, PLMN ID2, PLMN ID3 . . . in record 404, respectively, as indicated by dashed arrows in the figure, e.g. according to a predefined mapping scheme. Although this example illustrates that two successive system information blocks SIB1 and SIB2 contains the records 404 and 406, respectively, any selection and order of such system information blocks may be used to convey the PLMN ID record 404 and TAC record 406, and the invention is thus not limited in this respect.

Figure 5:
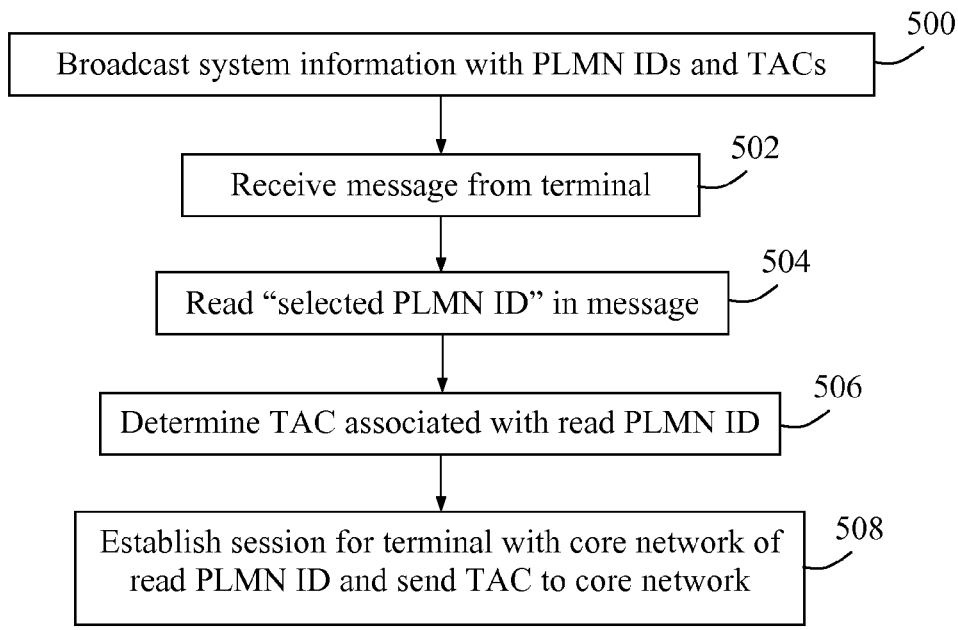
FIG. 5 is a flow chart illustrating a procedure in a shared radio node, according to further possible embodiments.

A procedure with actions executed in a radio node shared by operators of separate cellular networks, will now be described with reference to the flow chart in FIG. 5. In this example, a mobile terminal is present in a cell served by the shared radio node, e.g. as illustrated in FIG. 1, and the terminal has been pre-configured with a preferred cellular network having a specific known network identity.

A first action 500 illustrates that the shared radio node broadcasts system information that comprises network identities, PLMN IDs, of the cellular networks and multiple operator specific tracking area codes, TACs, valid in respective tracking area plans in the cellular networks, e.g. according to any of the schemes shown in FIGS. 2-4. In this broadcasted system information, each tracking area code is thus associated with a corresponding network identity, e.g. according to a predefined mapping scheme as described above. Thereby, the operators are able to use their own operator specific tracking area codes for their respective operator specific tracking areas that include the cell covered by the shared radio node, as explained above.

The broadcasted system information is received by the terminal present in the cell which can recognize a network identity of its preferred cellular network among the broadcasted network identities, i.e. PLMN IDs. A next action 502 illustrates that the shared radio node receives a message from the terminal containing a network identity of a preferred cellular network, which triggers the radio node to report the whereabouts of the terminal to the core network of the cellular network. In a more detailed example, the received message may be a so-called RRC Connection Setup Complete message issued when the terminal establish an RRC connection for an upper layer session that may involve any of: a tracking area update, a service request and a paging response, depending on the situation, although the invention is not limited to these particular examples. The RRC Connection Setup Complete message thus contains information about a selected PLMN, i.e. the network identity of the preferred cellular network.

The shared radio node then reads the network identity of the preferred cellular network in the received message, in a further action 504, and determines an operator specific tracking area code associated with the read network identity, in a following action 506. The determined tracking area code is thus valid for that particular terminal and its preferred cellular network but is not necessarily valid or useful for other cellular networks which are free to use other operator specific tracking area codes for the cell covered by the shared radio node, e.g. depending on their individual tracking area plans, cell plans or the like.

Irrespective of which one of the above situations occurs, the shared radio node establishes a session for the terminal with a core network of the read network identity once the above message has been received from the terminal, and sends the operator specific tracking area code to the core network, in a last shown action 508. In this way, the shared radio node can report the whereabouts of the terminal on a tracking area level to the core network of the terminal's preferred cellular network, even when different operator specific tracking area codes are used for different cellular networks and operators.

Figure 6:
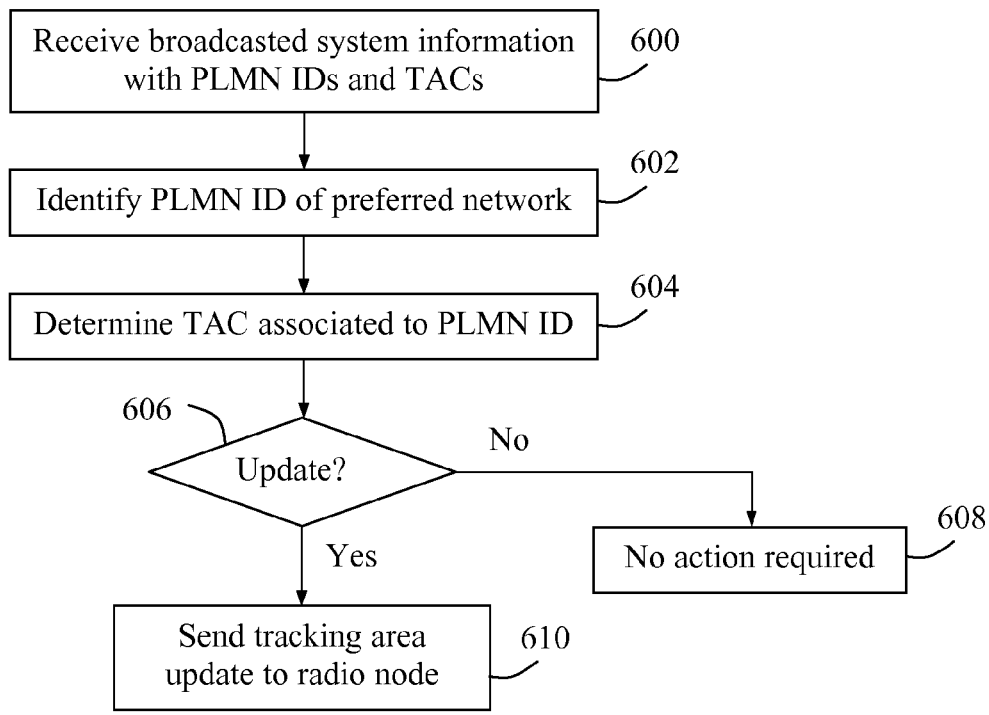
FIG. 6 is a flow chart illustrating a procedure in a mobile terminal, according to further possible embodiments.

A procedure with actions executed in a mobile terminal for using a radio node shared by operators of separate cellular networks, will now be described with reference to the flow chart in FIG. 6. As in the previous example, the terminal is present in a cell served by the shared radio node and has been pre-configured with a preferred cellular network having a specific known network identity, PLMN ID. In this example, the terminal may be in idle state in which it is required to provide tracking area updates to a core network serving the terminal, e.g. whenever the terminal moves into another tracking area than previously reported.

A first action 600 illustrates that the terminal receives broadcasted system information that comprises network identities, PLMN IDs, of the cellular networks and multiple operator specific tracking area codes, TACs, valid in respective tracking area plans of the operators, each tracking area code being associated with a corresponding network identity in the system information. In a next action 602, the terminal identifies, among the broadcasted network identities, the network identity PLMN ID of the preferred cellular network.

In a further action 604, the terminal determines a tracking area code TAC associated with the identified network identity PLMN ID, and determines in a following action 606 whether it is necessary to update a tracking area or not, based on the determined tracking area code. If not, no further action is required, as illustrated by a schematic block 608. Otherwise, if a tracking area update was determined to be necessary, the terminal sends a tracking area update to the radio node, which is directed to the core network of the identified network identity, in a final shown action 610.

Figure 7:
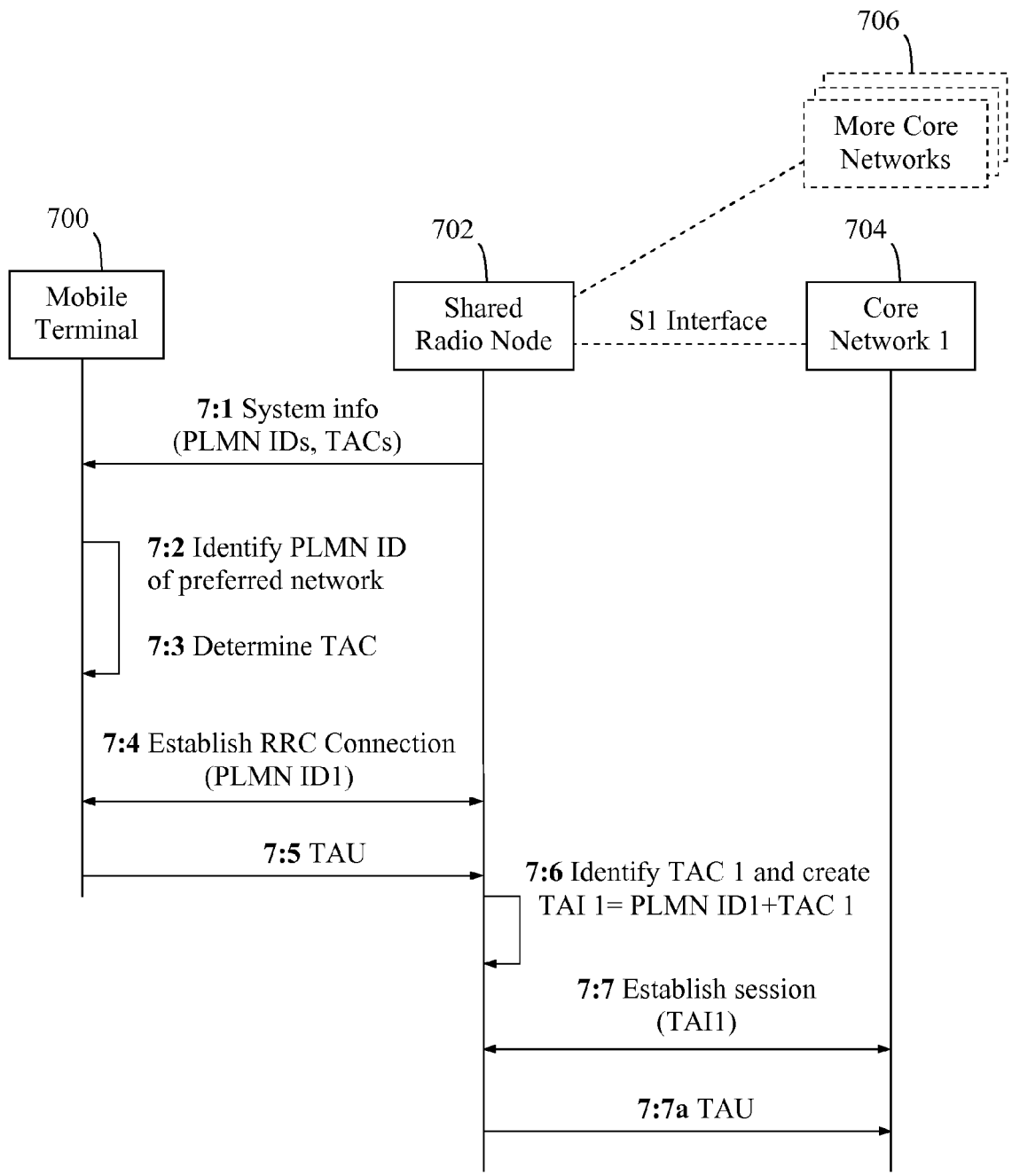
FIG. 7 is a signalling diagram illustrating how an operator specific tracking area code can be employed in practice, according to further possible embodiments.

An example of how this solution can be used in a radio node and a mobile terminal in practice will now be described with reference to the signalling diagram in FIG. 7, the radio node 702 thus being shared by operators of separate cellular networks. This figure illustrates that the radio node 702 is connected to a core network 704 of a cellular network preferred by the terminal 700, using a connection over an S1 interface. The radio node 702 is likewise connected to other core networks 706 as well, which are however not involved in the following actions.

In this example, the mobile terminal 700 is in idle state and enters a cell served by the shared radio node 702. A first action 7:1 illustrates that the mobile terminal 700 receives system information broadcasted from the radio node 702, including multiple network identities PLMN IDs and associated operator specific tracking area codes TACs.

In a next action 7:2, terminal 700 reads the broadcasted PLMN IDs and identifies a network identity, e.g. PLMN ID1, of its own preferred cellular network, basically corresponding to action 602 above. A following action 7:3 illustrates that the terminal 700 also determines which tracking area code, e.g. TAC1, among the broadcasted TACs, is associated with the identified PLMN ID1, e.g. by using a predefined mapping scheme, basically corresponding to action 604 above. In this example, terminal 700 thereby discovers that it is necessary to update its tracking area after finding that it has entered a new tracking area since the last tracking area update was sent to the core network, according to an operator-specific tracking area plan, i.e. the determined TAC1 is different from the TAC used in the last tracking area update procedure.

Figure 8:
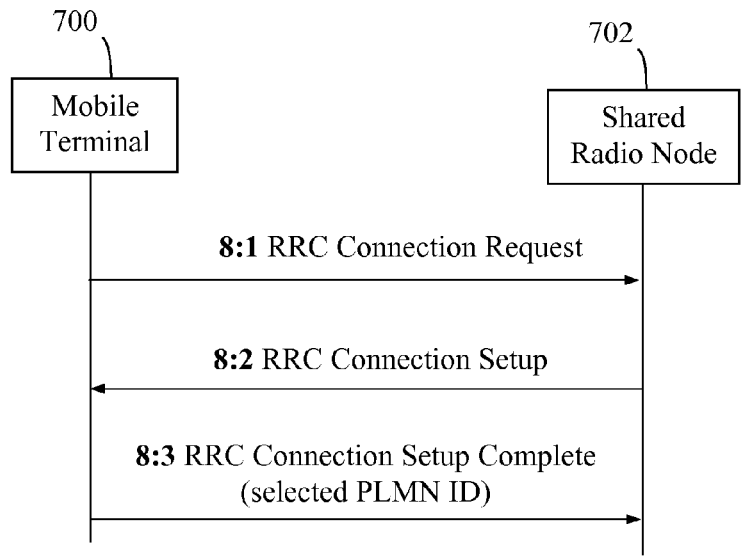
FIG. 8 is a signalling diagram illustrating an RRC connection setup procedure as such that can be used for this solution.

In order to provide the new tracking area to the core network 704, an RRC (Radio Resource Control) connection is established for the terminal with the radio node 702, in an action 7:4. During setup of this connection, the mobile terminal 700 sends the identified PLMN ID1 in an RRC Connection Setup Complete message to the radio node, as shown in FIG. 8 which illustrates how action 7:4 can be executed in more detail according to a possible example. In addition, the terminal sends the tracking area update message to the radio node, as shown in an action 7:5. FIG. 8 thus illustrates a setup procedure corresponding to action 7:4 above including an RRC Connection Request sent from terminal 700, action 8:1, an RRC Connection Setup returned from node 702, action 8:2, and the RRC Connection Complete with "selected PLMN ID" sent from terminal 700, action 8:3.

Returning to FIG. 7, the radio node 702 can, upon receiving PLMN ID1 from terminal 700, identify TAC1 based on the PLMN ID1, e.g. according to a predefined mapping scheme if used, and create a parameter called "Tracking Area Identity" TAI 1 from the PLMN ID1 and the TAC1, in an action 7:6. Thus, TAI 1=PLMN ID1+TAC 1. In a further action 7:7, the radio node 702 establishes a session with the core network 704 of PLMN ID1. As part of this action, the radio node 702 sends the TAI parameter to the core network. In addition, the radio node forwards the TAU message to the core network, as illustrated in a sub-action 7:7a.

Figure 9:
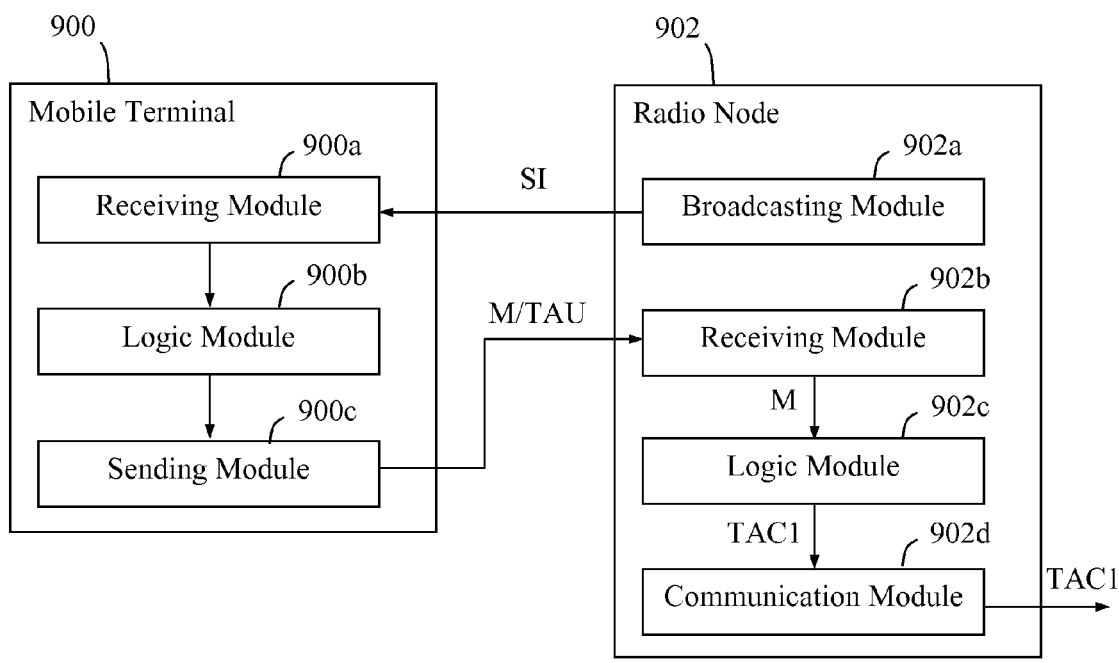
FIG. 9 is a schematic block diagram illustrating a radio node and a mobile terminal in more detail, according to further possible embodiments.

A detailed but non-limiting example of how a mobile terminal and a shared radio node can be configured to accomplish the above-described solution, is illustrated by the block diagram in FIG. 9. The radio node 902 is thus shared by operators of separate cellular networks and the terminal 900 is configured to use the radio node 902 when present in a cell served by the radio node 902, e.g. in the manner described above for any of FIGS. 1-8.

The radio node 902 comprises a broadcasting module 902*a* adapted to broadcast system information that comprises network identities of the cellular networks and multiple operator specific tracking area codes valid in respective tracking area plans of the operators, each tracking area code being associated with a corresponding network identity in the system information. Thereby, the operators are enabled to use the operator specific tracking area codes for operator specific tracking areas that include a cell covered by the radio node.

The radio node 902 further comprises a receiving module 902*b* adapted to receive a message M from a mobile terminal 900. The radio node 902 also comprises a logic module 902*c* adapted to read a network identity of a preferred cellular network in the received message, and to determine an operator specific tracking area code TAC1 associated with the read network identity. The radio node 902 also comprises a communication module 902*d* adapted to establish a session for the terminal with a core network, not shown, of the read network identity and to send the operator specific tracking area code TAC1 to the core network.

The above radio node 902 and its functional modules 902*a*-902*d* may be configured or adapted to operate according to various optional embodiments. For example, the broadcasting module 902*a* may be further adapted to broadcast the record of tracking area codes and to broadcast the record of network identities in one system information block. Alternatively, the broadcasting module 902*a* may be adapted to broadcast the record of network identities in one system information block and to broadcast the record of tracking area codes in another system information block. The broadcasting module 902*a* may otherwise be adapted to broadcast the network identities and the corresponding tracking area codes jointly in a common record.

The mobile terminal 900 comprises a receiving module 900*a* adapted to receive broadcasted system information that comprises network identities of the cellular networks and multiple operator specific tracking area codes valid in respective tracking area plans of the cellular networks, each tracking area code being associated with a corresponding network identity in the system information. The terminal 900 further comprises a logic module 900*b* adapted to identify, among the broadcasted network identities, a network identity of a preferred cellular network, determine a tracking area code associated with the identified network identity, and to determine whether it is necessary to update a tracking area of the terminal based on the determined tracking area code. The terminal 900 also comprises a sending module 900*c* adapted to send a tracking area update TAU to the radio node directed to a core network corresponding to the identified network identity, if a tracking area update was determined to be necessary.

It should be noted that FIG. 9 merely illustrates various functional modules or units in the radio node 902 and mobile terminal 900 in a logical sense, although the skilled person is free to implement these functions in practice using suitable software and hardware means. Thus, this aspect of the solution is generally not limited to the shown structures of the radio node 902 and mobile terminal 900, while their functional modules 902*a*-*d* and 900*a*-*c* may be configured to operate according to the features described for any of FIGS. 1-8 above, where appropriate.

The functional modules 902*a*-*d* and 900*a*-*c* described above can be implemented in the radio node 902 and mobile terminal 900, respectively, as program modules of a respective computer program comprising code means which, when run by a processor "P" in each of the radio node 902 and mobile terminal 900 causes them to perform the above-described actions. Each processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in either of the radio node 902 and mobile terminal 900, respectively, in the form of a memory "M" connected to each processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the radio node 902 and mobile terminal 900.

When using the solution according to any of the above-described embodiments, one or more of the following advantages may be achieved. Firstly, each operator sharing the radio node can organize it in a tracking area of its own operator specific tracking area plan without having to agree or compromise on a common tracking area with other operators. Secondly, each operator can use any suitable TAC for that tracking area, without having to coordinate and share the TAC with any other operator. Thirdly, the shared radio node is able to properly report the whereabouts of any terminals to the core networks of their respective preferred cellular networks, with consideration for the respective operator specific tracking area plans.

While the invention has been described with reference to specific exemplary embodiments, the description is generally only intended to illustrate the inventive concept and should not be taken as limiting the scope of the invention. For example, the terms "radio node", "cellular network", "mobile terminal", "system information", "network identity", "tracking area code" and "system information block" have been used throughout this description, although any other corresponding nodes, functions, and/or parameters could also be used having the features and characteristics described here. The invention is defined by the appended claims.

The invention claimed is:

1. A method in a radio node (RN) shared by operators of separate cellular networks having operator-specific tracking area plans, the method comprising:
    broadcasting system information that comprises network identities of said cellular networks and multiple operator-specific tracking area codes valid in respective tracking area plans in said cellular networks, each tracking area code being associated with a corresponding network identity in said system information, thereby enabling said operators to use operator-specific tracking area codes for operator-specific tracking areas that include a cell covered by said radio node;
    receiving a message from a mobile terminal;
    reading a network identity of a preferred cellular network in the received message;
    determining an operator-specific tracking area code associated with the read network identity;
    establishing a session for the terminal with a core network corresponding to the read network identity; and
    sending the operator-specific tracking area code to said core network.

2. The method according to claim 1, wherein the broadcasted tracking area codes are associated with the broadcasted network identities according to a predefined mapping scheme.

3. The method according to claim 2, wherein the predefined mapping scheme maps positions in a separately broadcasted record of tracking area codes to positions in a separately broadcasted record of network identities.

4. The method according to claim 3, wherein the record of tracking area codes and the record of network identities are broadcasted in one system information block.

5. The method according to claim 3, wherein the record of network identities is broadcasted in one system information block and the record of tracking area codes is broadcasted in another system information block.

6. The method according to claim 1, wherein the network identities and the corresponding tracking area codes are broadcasted jointly in a common record.

7. The method according to claim 1, wherein the message is received in connection with any of: a tracking area update, a service request and a paging response.

8. The method according to claim 7, wherein the received message is an RRC Connection Setup Complete message.

9. The method according to claim 7, wherein said tracking area code is sent together with said network identity in a Tracking Area Identity (TAI) to the core network.

10. A radio node configured for sharing by operators of separate cellular networks having operator-specific tracking area plans, the radio node comprising:
    a communication circuit configured to:
        broadcast system information that comprises network identities of said cellular networks and multiple operator-specific tracking area codes valid in respective tracking area plans of said operators, each tracking area code being associated with a corresponding network identity in said system information, thereby enabling said operators to use operator-specific tracking area codes for operator-specific tracking areas that include a cell covered by said radio node; and
        receive a message from a mobile terminal; and
    a processing circuit configured to:
        read a network identity of a preferred cellular network in the received message;
        determine an operator-specific tracking area code associated with the read network identity;
        establish, via the communication circuit, a session for the terminal with a core network corresponding to the read network identity; and
        send, via the communication circuit, the operator-specific tracking area code to said core network.

11. The radio node according to claim 10, wherein the communication circuit is configured to broadcast the record of tracking area codes and the record of network identities in one system information block.

12. The radio node according to claim 10, wherein the communication circuit is configured to broadcast the record of network identities in one system information block and to broadcast the record of tracking area codes in another system information block.

13. The radio node according to claim 10, wherein the communication circuit is configured to broadcast the network identities and the corresponding tracking area codes jointly in a common record.

14. A method in a mobile terminal for using a radio node shared by operators of separate cellular networks having operator-specific tracking area plans, the method comprising:
- receiving broadcasted system information that comprises network identities of said cellular networks and multiple operator-specific tracking area codes valid in respective tracking area plans of said operators, each tracking area code being associated with a corresponding network identity in said system information;
- identifying, among said broadcasted network identities, a network identity of a preferred cellular network;
- determining a tracking area code associated with the identified network identity;
- determining whether it is necessary to update a tracking area based on the determined tracking area code; and
- sending a tracking area update to the radio node directed to a core network of the identified network identity, if a tracking area update was determined to be necessary.

15. A mobile terminal for using a radio node shared by operators of separate cellular networks having operator-specific tracking area plans, the mobile terminal comprising:
- a communication circuit configured to:
  - receive broadcasted system information that comprises network identities of said cellular networks and multiple operator-specific tracking area codes valid in respective tracking area plans of said operators, each tracking area code being associated with a corresponding network identity in said system information; and
- a processing circuit configured to:
  - identify, among said broadcasted network identities, a network identity of a preferred cellular network;
  - determine a tracking area code associated with the identified network identity;
  - determine whether it is necessary to update a tracking area based on the determined tracking area code; and
  - send, via the communication circuit, a tracking area update (TAU) to the radio node directed to a core network of the identified network identity, if a tracking area update was determined to be necessary.

* * * * *